(12) United States Patent  
Fan et al.

(10) Patent No.: US 9,194,993 B2  
(45) Date of Patent: Nov. 24, 2015

(54) THREE-DIMENSIONAL DISPLAY APPARATUS AND BACKLIGHT MODULE THEREOF

(75) Inventors: Fu-Chen Fan, Hsin-Chu (TW); Hsing-Jung Chuang, Hsin-Chu (TW); Tzu-Ling Niu, Hsin-Chu (TW); Yu-Ping Wu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 893 days.

(21) Appl. No.: 13/333,779

(22) Filed: Dec. 21, 2011

(65) Prior Publication Data

US 2012/0170315 A1    Jul. 5, 2012

(30) Foreign Application Priority Data

Dec. 31, 2010 (TW) ................................ 99147348 A (51) Int. Cl.  
    *F21V 7/04*      (2006.01)  
    *F21V 8/00*      (2006.01)  
    *G02B 5/04*      (2006.01)  
    *G02B 27/22*      (2006.01)

(52) U.S. Cl.  
    CPC .............. *G02B 6/0036* (2013.01); *G02B 5/045* (2013.01); *G02B 27/2214* (2013.01); *G02B 27/2242* (2013.01)

(58) Field of Classification Search  
    CPC ............. G02B 6/0038; G02B 66/0068; G02B 6/0073; G02B 6/0035; G02B 6/0036  
    USPC .......................................... 362/613, 617–620  
    See application file for complete search history.

(56) References Cited

U.S. PATENT DOCUMENTS

| | | | | |
|---|---|---|---|---|
| 6,582,095 B1 * | 6/2003 | Toyoda | .......................... | 362/235 |
| 6,669,350 B2 * | 12/2003 | Yamashita et al. | ............ | 362/612 |
| 7,273,311 B2 * | 9/2007 | Yu | .................................. | 362/620 |

(Continued)

FOREIGN PATENT DOCUMENTS

| | | |
|---|---|---|
| CN | 1766713 A | 5/2006 |
| CN | 101025518 A | 8/2007 |

(Continued)

OTHER PUBLICATIONS

English translation of abstract and pertinent parts of CN 1766713 A.

(Continued)

*Primary Examiner* — Robert May  
*Assistant Examiner* — Byron T Gyllstrom  
(74) *Attorney, Agent, or Firm* — McClure, Qualey & Rodack, LLP (57) ABSTRACT

A three-dimensional display apparatus and a backlight module thereof are provided. The display apparatus further includes a display panel disposed on the backlight module. The backlight module has a light guide plate, a plurality of microstructures, a first light source, and a second light source. The light guide plate has a bottom surface and a light emitting surface opposite to the bottom surface, wherein the microstructures are disposed on at least one of the two surfaces. The first light source is at a first corner of the light guide plate while the second light source is at a second corner opposite to the first corner. A first surface and a second surface of the microstructure define an orientation direction (or form a distribution direction) along or parallel to the diagonal line through the first and second corners.

12 Claims, 13 Drawing Sheets

(56) References Cited

U.S. PATENT DOCUMENTS

| | | | |
|---|---|---|---|
| 7,452,119 B2* | 11/2008 | Onishi et al. | 362/620 |
| 7,527,412 B2* | 5/2009 | Lee et al. | 362/617 |
| 7,677,733 B2* | 3/2010 | Brott | 353/7 |
| 7,845,810 B2* | 12/2010 | Chang | 362/97.2 |
| 7,876,397 B2 | 1/2011 | Krijn et al. | |
| 2002/0145686 A1 | 10/2002 | Ohkawa | |
| 2004/0012944 A1* | 1/2004 | Suzuki et al. | 362/31 |
| 2004/0114069 A1* | 6/2004 | Lai | 349/65 |
| 2007/0159849 A1* | 7/2007 | Sakai | 362/612 |
| 2008/0002432 A1* | 1/2008 | Ueno et al. | 362/620 |
| 2009/0034293 A1* | 2/2009 | Parker | 362/619 |
| 2010/0027293 A1* | 2/2010 | Li | 362/619 |

FOREIGN PATENT DOCUMENTS

| | | |
|---|---|---|
| CN | 101290428 A | 10/2008 |
| JP | 2002296425 A | 10/2002 |
| TW | 530956 | 5/2003 |
| TW | 200817784 | 4/2008 |
| TW | I307791 | 3/2009 |
| TW | I320161 | 2/2010 |
| TW | I332068 | 10/2010 |

OTHER PUBLICATIONS

English translation of abstract and pertinent parts of CN 101025518 A.

English translation of abstract and pertinent parts of CN 101290428 A.

China Office Action dated Mar. 31, 2012.

English translation of abstract of TW I320161.

English translation of abstract of TW I307791.

English translation of abstract of TW 200817784 (published Apr. 16, 2008).

Taiwan Office Action dated Aug. 1, 2013.

* cited by examiner

THREE-DIMENSIONAL DISPLAY APPARATUS AND BACKLIGHT MODULE THEREOF

BACKGROUND OF THE INVENTION

1. Field of the Invention

The present invention relates to a three-dimensional display apparatus and a backlight module thereof; particularly, the present invention relates to a three-dimensional display apparatus capable of providing multidirectional stereoscopic images and a backlight module thereof.

2. Description of the Prior Art

As the market for stereoscopic visual effect is growing, the applications of three-dimensional display are continuously increased in different fields, such as television, desktop monitor, notebook computer, portable devices, camera, etc. Three-dimensional technique utilizes two offset images separately for two eyes of the viewer to combine a stereoscopic image. Traditionally, the display apparatus capable of generating stereoscopic visual effect differs in two major groups: requiring special glasses and requiring no special glasses. The display apparatus requiring no special glasses is classified into two types: (1) disposing a light splitting film at exterior of the display panel to sequentially providing images generated by the display apparatus separately to the right eye and the left eye; (2) disposing light splitting structures inside the backlight module to allow the light from the backlight module is directionally split to produce images respectively at the right eye and the left eye after light passing through the display panel.

Figure 1A:
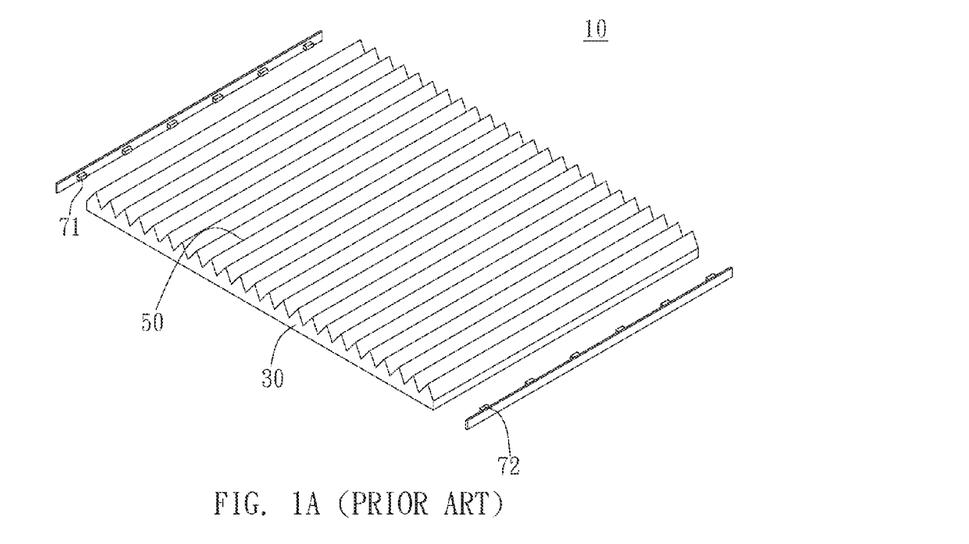
FIG. 1A is a schematic view of the traditional three-dimensional display apparatus.
Figure 1B:
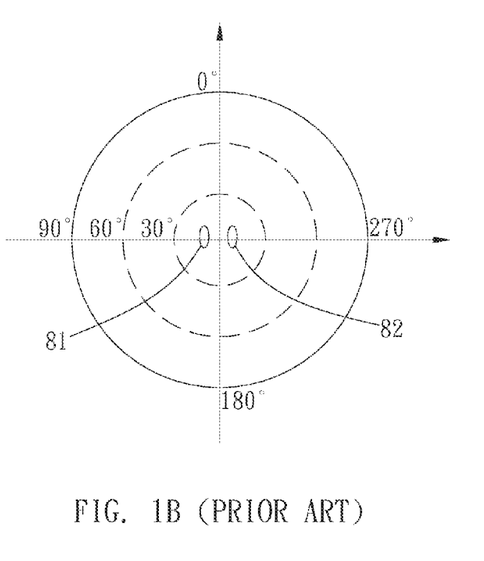
FIG. 1B is a schematic view of the distribution of light emitting from the backlight module of the traditional three-dimensional display apparatus.

FIG. 1A illustrates the backlight module used in the second type of display apparatus requiring no special glasses. As shown in FIG. 1A, the backlight module 10 includes a light guide plate 30, a first light source 71, and a second light source 72. Prismatic structures 50 are disposed on the light guide plate 30 along the long axis of the light guide plate 30. The first light source 71 and the second light source 72 are disposed at two opposite sides of the light guide plate 30 to alternatively emit light perpendicular to the extension direction of the prismatic structures 50 into the light guide plate 30. Lights from the first light source 71 and the second light source 72 will be split by the prismatic structures 50 to respectively produce intensity peak areas 81 and 82 in a direction parallel to the long axis of the light guide plate 30, as shown in FIG. 1B. In other words, when the viewer's eyes are parallel to the long axis of the light guide plate 30, the left eye and the right eye will receive lights from the first light source 71 and the second light source 72, respectively. Therefore, the viewer's left eye and right eye may be aware of different images that are combined to provide the stereoscopic visual effect.

However, in the above design, when the display apparatus is rotated to a vertical position, (i.e. viewer's eyes are vertical to the long axis of the light guide plate 30) the distribution direction of the intensity peak areas 81 and 82 will be perpendicular to the viewer's eyes. As such, the viewer's left eye and right eye will not respectively receive the predetermined images and the stereoscopic visual effect no longer exist.

SUMMARY OF THE INVENTION

It is an object of the present invention to provide a three-dimensional display apparatus and a backlight module thereof for maintaining the stereoscopic effect even after the display apparatus is rotated.

The three-dimensional display apparatus includes a display panel and a backlight module, wherein the display panel is disposed above the backlight module to receive light from the backlight module. The display image can be formed by the display panel controlling light from the backlight module. The backlight module includes a light guide plate, a plurality of microstructures, a first light source, and a second light source. The light guide plate includes a bottom surface and a light emitting surface opposite to the bottom surface. Microstructures are disposed on at least one of the bottom surface and the light emitting surface. A first light source is disposed at a first corner of the light guide plate and the light from the first light source is emitted into the light guide plate from a side edge of the light guide plate. A second light source is disposed at a second corner of the light guide plate and the light from the second light source is emitted into the light guide plate from a side edge of the light guide plate inside. The first corner and the second corner are two opposite corners. The first surface and the second surface of each microstructure are distributed in an orientation direction, wherein the orientation direction and a side edge of the light guide plate form an angle of about 45 degrees.

The first light source and the second light source are activated alternatively to form backlights with different light emitting angles in different time periods. When the first light source is activated, the light emitting direction is changed by the microstructures after light is incident on the light guide plate, so that the first peak area of light is shifted toward the first light source. When the second light source is activated, the second peak area of light is shifted toward the second light source. Because the first peak area crosses the long axis and the short axis of the light guide plate and the second peak area is opposite to the first peak area with respect to the origin at which the long axis and the short axis of the light guide plate are crossed, the viewer may receive separate images for left eye and right eye and obtain a stereoscopic image no matter whether the viewer's eyes are parallel to the long axis or the short axis.

DETAILED DESCRIPTION OF THE PREFERRED EMBODIMENT

The present invention provides a three-dimensional display apparatus and a backlight module thereof. In a preferred embodiment, the three-dimensional display apparatus is a liquid crystal display apparatus, which may be utilized in planar television, the monitor of personal computer, the display screen of notebook computer, or the display of other electronic devices.

Figure 2:
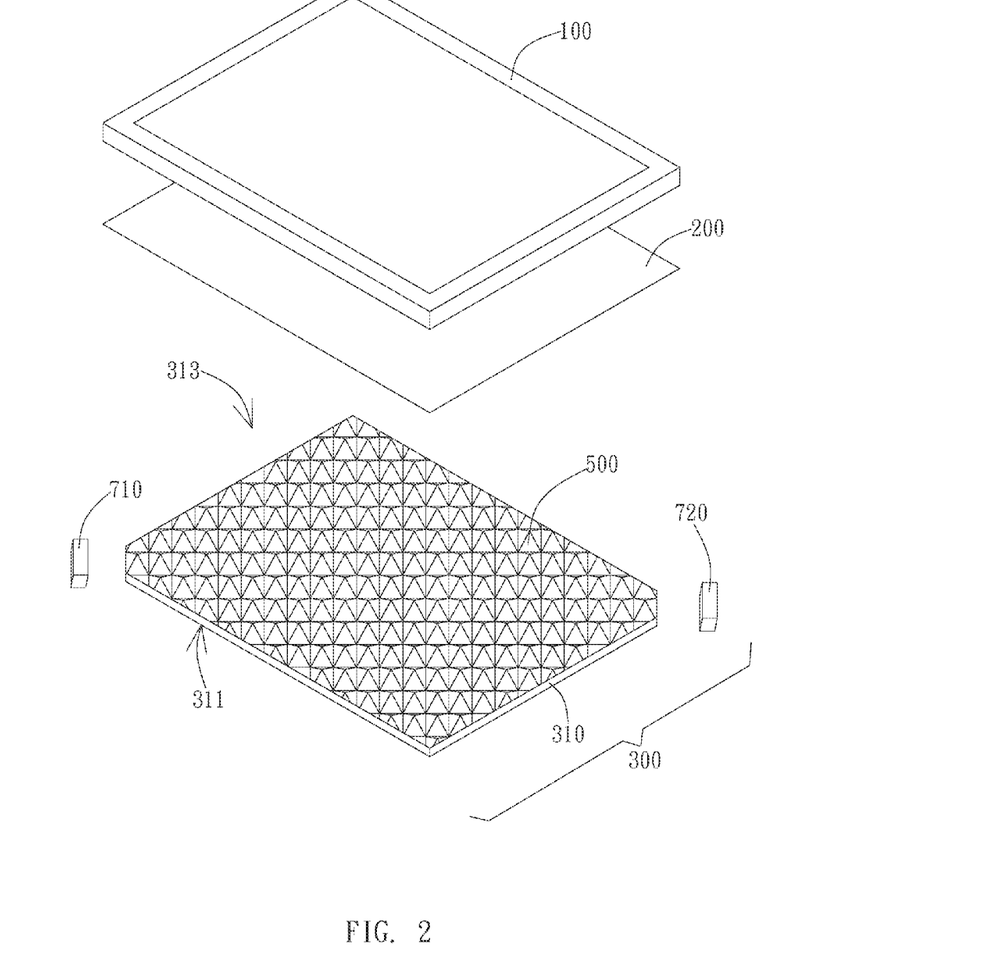
FIG. 2 is an exploded view of an embodiment of the three-dimensional display apparatus.

As shown in FIG. 2, the three dimensional display apparatus includes a display panel 100 and a backlight module 300. In a preferred embodiment, the display panel 100 is a liquid crystal display panel that can be transmission type, transflective type, or other types. The display panel 100 is disposed on the backlight module 300 to receive light provided by the backlight module 300, so that the display image can be formed by the display panel 100 controlling the light from the backlight module 300. Besides, in this embodiment, the three dimensional display apparatus further includes a prism sheet 200 disposed between the backlight module 300 and the display panel 100 to adjust the optical effect. The prism sheet 200 preferably provides brightness enhancement effect, diffusion effect, or other optical effects.

Figure 3:
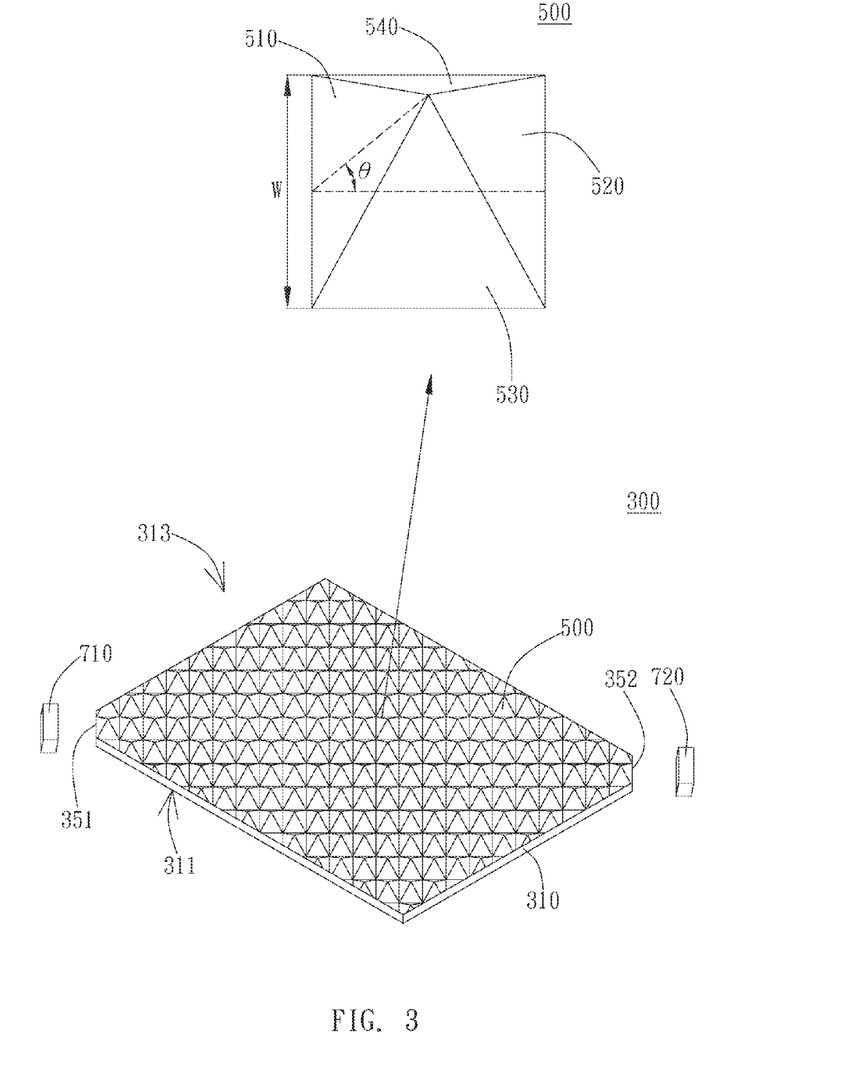
FIG. 3 is a schematic view of an embodiment of the backlight module.

FIG. 3 is a schematic view of an embodiment of the backlight module 300. In this embodiment, the backlight module 300 includes a light guide plate 310, a plurality of microstructures 500, a first light source 710, and a second light source 720. The light guide plate 310 has a bottom surface 311 and a light emitting surface 313 opposite to the bottom surface 311. As shown in FIG. 3, a plurality of microstructures 500 are disposed on the light emitting surface 313; however, in other embodiments, the microstructures 500 can be disposed on the bottom surface 311 or on both the bottom surface 311 and the light emitting surface 313. In this embodiment, the microstructure 500 is formed as a pyramid body and has a first surface 510 and a second surface 520 disposed opposite to the first surface 510. Each of the first surface 510 and the second surface 520 forms an included angle 8 with the light emitting surface 313, wherein the included angle 8 is preferably between 40 degrees and 50 degrees. As shown in FIG. 3, the first surface 510 and the second surface 520 are two opposite sidewalls of the pyramid body. The microstructure 500 further includes a third surface 530 and a fourth surface 540 disposed opposite to each other and formed as another two sidewalls of the pyramid body. Besides, the bottom of the pyramid body preferably has a square shape; however, the bottom of the pyramid body may have other shape, such as rhombus or parallelogram. In a different embodiment, the microstructure 500 may be other shapes, such as a triangular prism.

Figure 4:
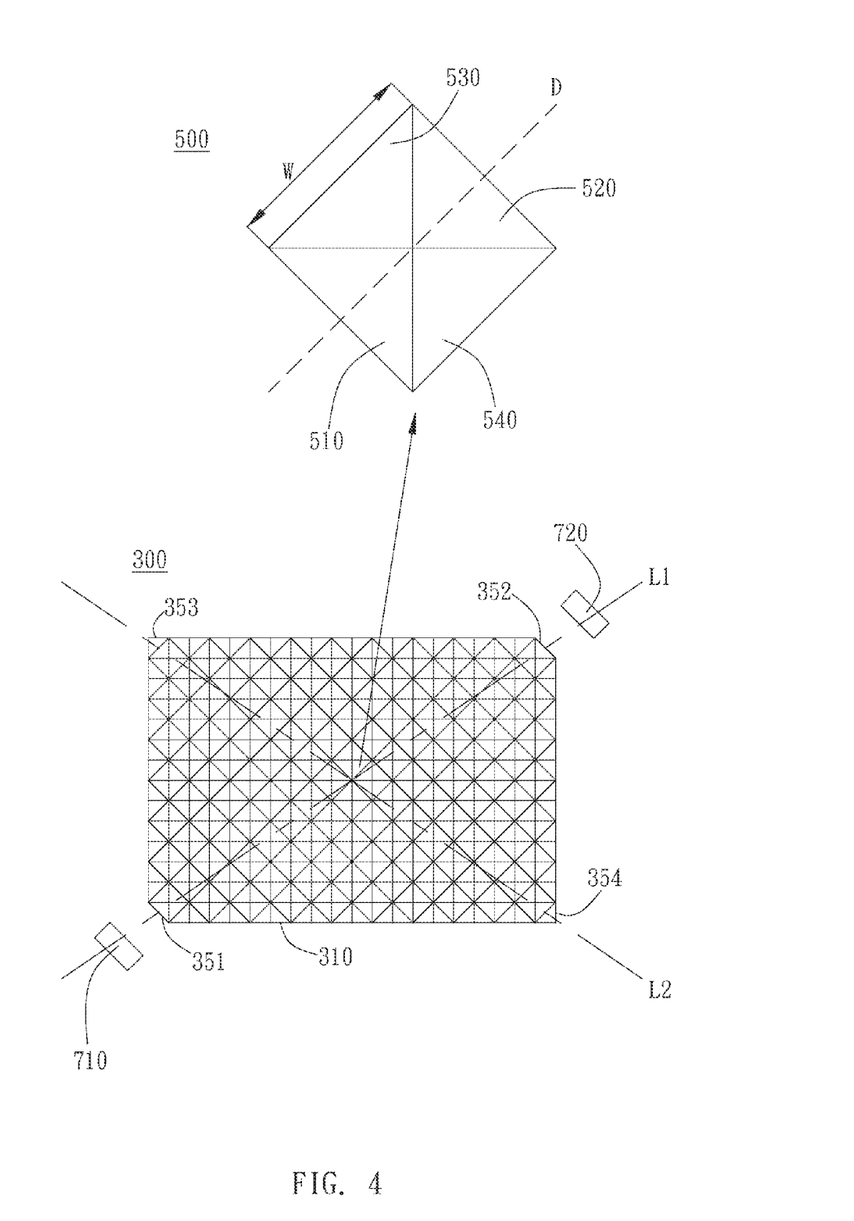
FIG. 4 is a schematic view of the backlight module of FIG. 3 adopted the landscape mode arrangement.

As shown in FIG. 4, a first light source 710 is disposed at a first corner 351 of the light guide plate 310 and the light from the first light source 710 enters the light guide plate 310 from the side edge of the light guide plate 310. A second light source 720 is disposed at a second corner 352 of the light guide plate 310 and the light from the second light source 720 enters the light guide plate 310 from the corresponding side edge of the light guide plate 310. The first corner 351 and the second corner 352 are two opposite corners of the light guide plate 310 and preferably cut to form cutting faces respectively corresponding to the first light source 710 and the second light source 720. In this embodiment, the light guide plate 310 has a rectangle shape so that the light guide plate 310 is divided into two halves by a diagonal line L1 that connects the first corner 351 to the second corner 352, wherein the first light source 710 and the second light source 720 are disposed along the diagonal L1. The first light source 710 and the second light source 720 preferably emit light along the diagonal line L1; however, in different embodiments, the direction of light emitted from the first light source 710 and the second light source 720 may slightly offset from the diagonal line L1, i.e. the direction of light emitted from the first light source 710 and the second light source 720 are not parallel to the diagonal line L1.

Moreover, in a preferred embodiment, the first surface 510 and the second surface 520 of each microstructure 500 are distributed in an orientation direction D, wherein the orientation direction D and a side edge of the light guide plate form an angle of about 45 degrees. The orientation direction D is preferably a projection of the normal line of the first surface 510 or the second surface 520 on the light emitting surface 313; however, in different embodiments, the orientation direction D may be referred to a direction perpendicular to the boundary of the first surface 510 and the light emitting surface 313 or of the second surface 520 and the light emitting surface 313. In this embodiment, since the first surface 510 is disposed opposite to the second surface 520, the orientation direction D of the first surface 510 is parallel to the orientation direction D of the second surface 520. In this embodiment, since the light guide plate 310 has a rectangle shape, the diagonal line L1 includes an angle other than 45 degrees with the long axis or the short axis of the light guide plate 310 at the side or the center. At this point, in consideration of the arrangement of the microstructures 500, the orientation direction D may not be parallel to the diagonal line L1. In such a case, the orientation direction D is said to be along the diagonal line L1 when the diagonal line L1 runs from upper right to lower left and the orientation direction D also runs from upper right to lower left. In other embodiments, the orientation direction D is also said to be along the diagonal line L1 when the diagonal line L1 runs from upper left to lower right and the orientation direction D also runs from upper left to lower right.

As shown in FIG. 3 and FIG. 4, the first surface 510 and the second surface 520 respectively form a projection pitch W. In this embodiment, the projection pitch W is equal to the width of the boundary of the first surface 510 and the light emitting surface 313 or the width of the boundary of the second surface 520 and the light emitting surface 313. The projection pitch W is preferably between 0.01 mm and 0.07 mm and more preferably between 0.02 mm and 0.07 mm.

As shown in FIG. 4, the third corner 353 and the fourth corner 354 of the light guide plate 310 are free of any light source; that is, no light source is disposed at the third corner 353 and the fourth corner 354. The third corner 353 is opposite to the fourth corner 354, and a diagonal line L2 connecting the third corner 353 and the fourth corner 354 is not parallel to the diagonal line L1 that connects the first corner 351 and the second corner 352. In this embodiment, since the light guide plate 310 is a rectangle, the first corner 351, the second corner 352, the third corner 353, and the fourth corner 354 are four corners of the rectangle and the diagonal line L1 crosses the diagonal line L2.

Figure 5A:
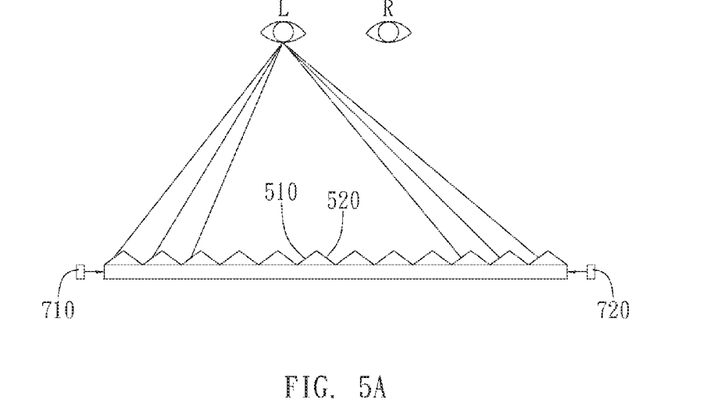
FIG. 5A is a schematic view of activating the first light source as shown in FIG. 3.
Figure 5B:
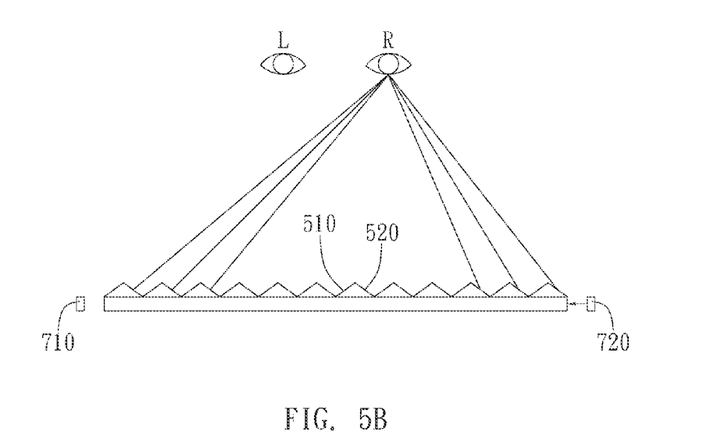
FIG. 5B is a schematic view of activating the second light source as shown in FIG. 3.
Figure 6:
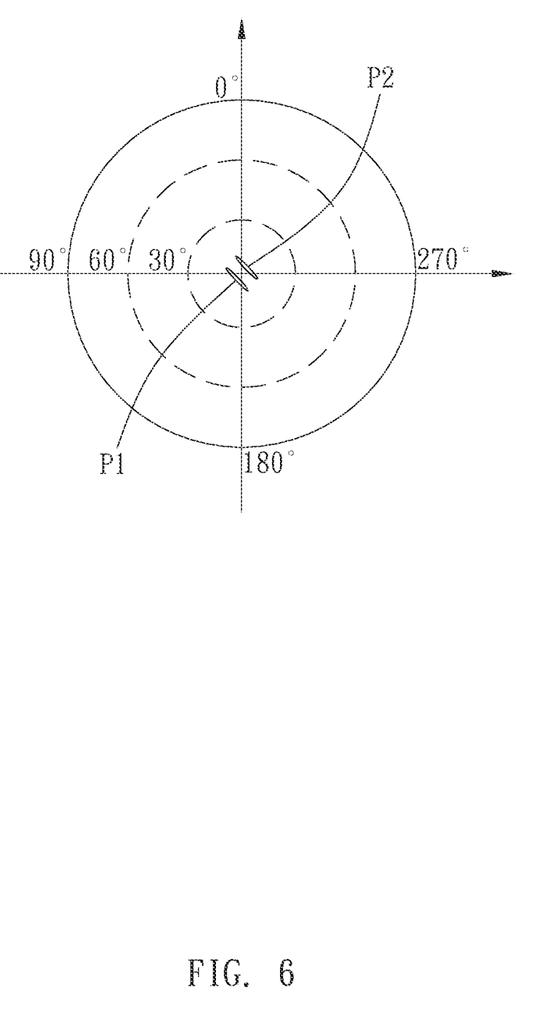
FIG. 6 is a schematic view of the distribution of light emitting from the backlight module.
Figure 7:
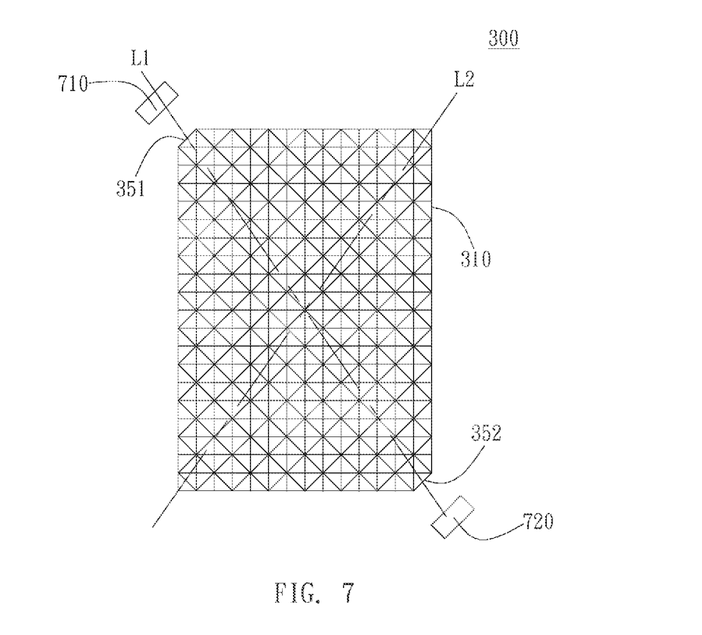
FIG. 7 is a schematic view of the backlight module adopted the portrait mode arrangement.

In the embodiment shown in FIG. 3 and FIG. 4, the first light source 710 and the second light source 720 are preferably activated alternatively to form backlights with different light emitting angles in different time periods. As shown in FIG. 5A, when the first light source 710 is activated, the light emitting direction will be changed by the microstructures 500 after light is incident on the light guide plate 310, so that a first peak area P1 of light is shifted toward the first light source 710. As shown in FIG. 5B, when the second light source 720 is activated, a second peak area P2 of light is shifted toward the second light source 720. Since the first light source 710, the second light source 720, and the orientation direction D of the first surface 510 and the second surface 520 are disposed along the diagonal line L1, the shift phenomenon is mainly distributed along the diagonal line L1, as shown in FIG. 6. Because the first peak area P1 traverses areas in the long axis direction and the short axis direction of the light guide plate 310 and the second peak area P2 is opposite to the first peak area P1 with respect to the origin at which the long axis direction and the short axis direction of the light guide plate 310 are crossed, the viewer may receive separate images for left eye and right eye and obtain a stereoscopic image no matter whether the viewer's eyes are parallel to the long axis or the short axis. In the embodiment of FIG. 4, when the long axis direction of the light guide plate 310 is disposed along the horizontal direction and parallel to the viewer's eyes, a landscape mode is provided. As shown in FIG. 7, when the short axis of the light guide plate 310 is disposed along the horizontal direction and parallel to the viewer's eyes, a portrait mode is provided. With the design mentioned above, the viewer may obtain the stereoscopic visual effect no matter whether the display apparatus is operated in the landscape mode or the portrait mode.

Figure 8:
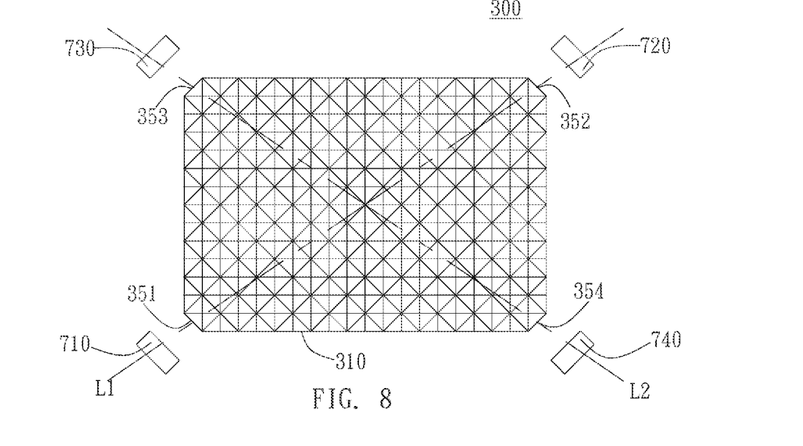
FIG. 8 is a schematic view of another embodiment of the backlight module.
Figure 9A:
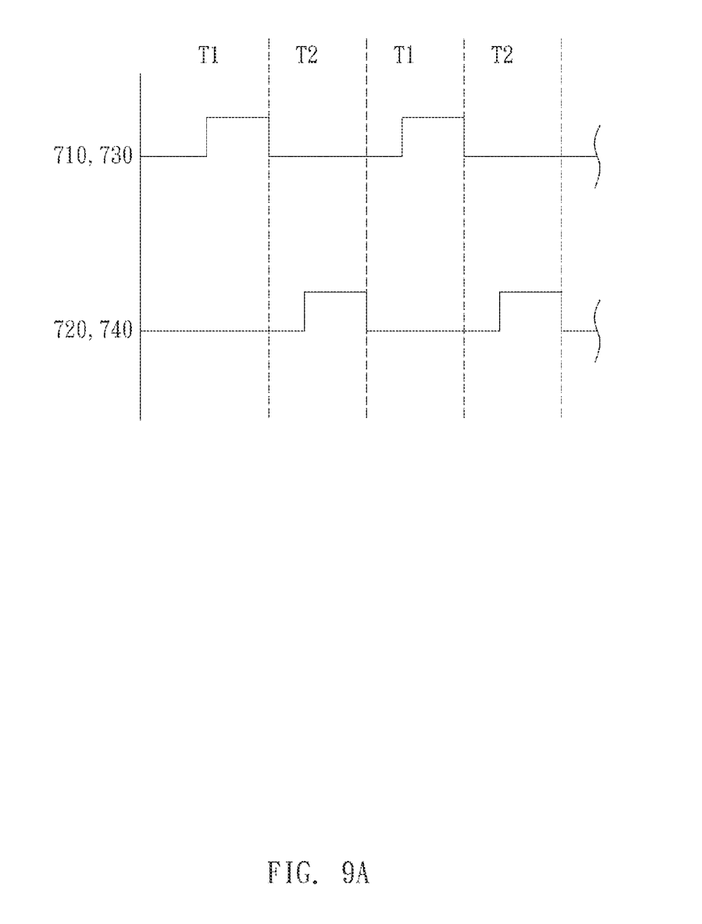
FIG. 9A is a timing diagram of activating light sources in the landscape mode.
Figure 9B:
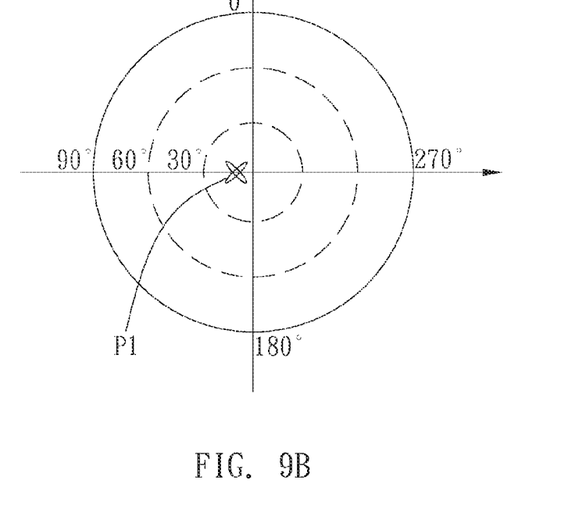
FIGS. 9B and 9C are schematic views of the distribution of light emitting from the backlight module at different time periods.
Figure 9C:
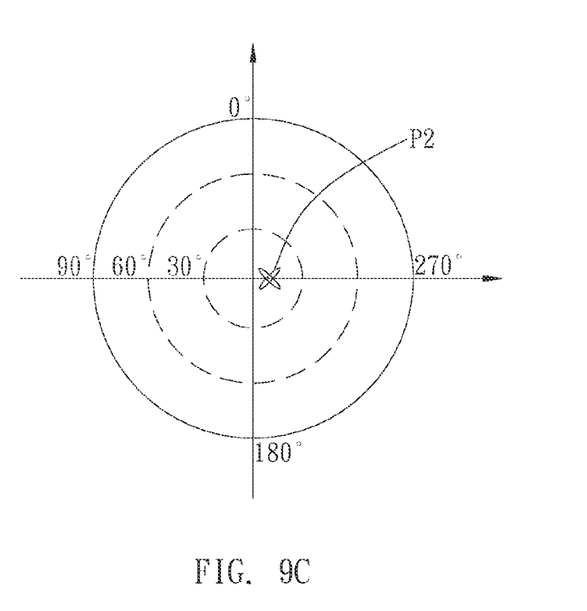

FIG. 8 is a schematic view of another embodiment of the backlight module. In this embodiment, the third light source 730 and the fourth light source 740 are respectively disposed at the third corner 353 and the fourth corner 354 of the light guide plate 310. Please also refer to FIG. 9A, when the three-dimensional display apparatus is operated in the landscape mode, the first light source 710 and the third light source 730 are simultaneously activated in a first time period T1 and deactivated in a second time period T2. The second light source 720 and the fourth light source 740 are simultaneously deactivated in the first time period T1 and activated in the second time period T2. FIG. 9B and FIG. 9C respectively show the distribution of the first peak area P1 in the first time period T1 and the distribution of the second peak area P2 in the second time period T2. Obviously, in this embodiment, when the landscape mode is operated, the first peak area P1 and the second peak area P2 may intensively fall on the long axis.

Figure 10A:
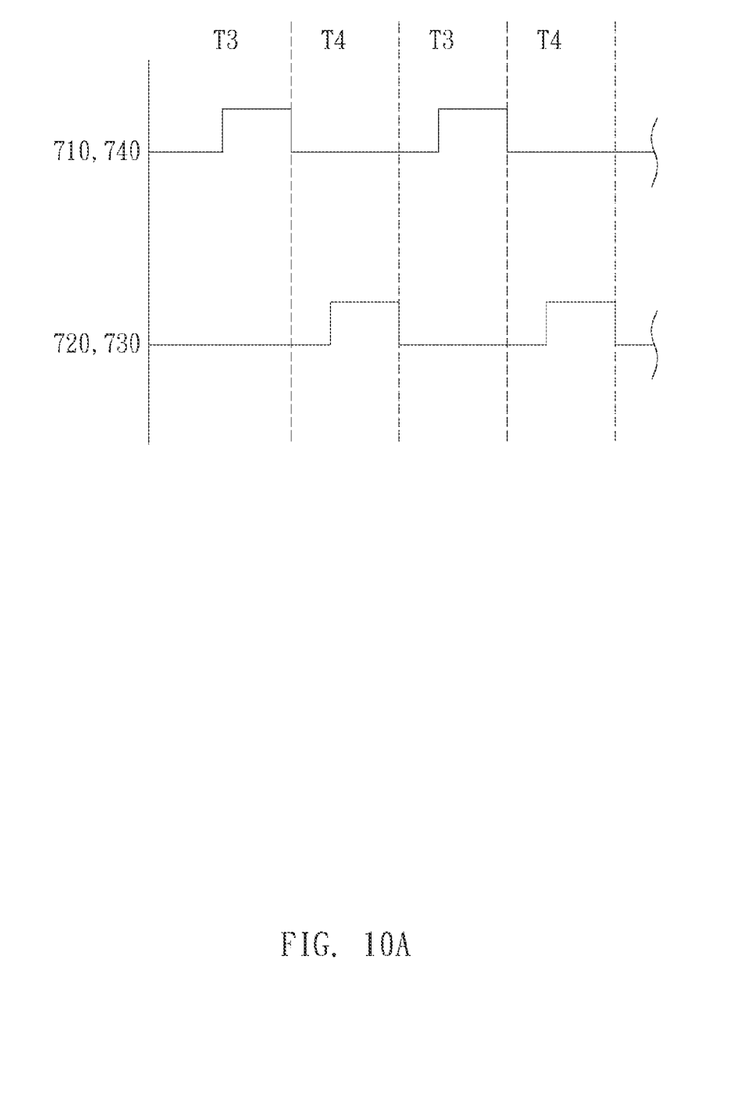
FIG. 10A is a timing diagram of activating light sources in the portrait mode.
Figure 10B:
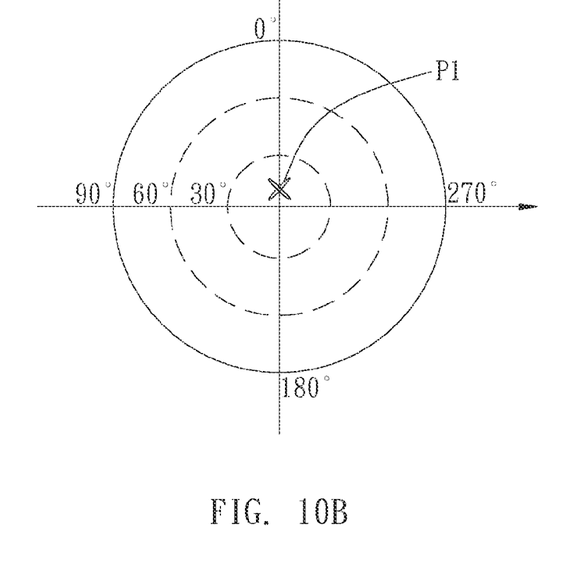
FIGS. 10B and 10C are schematic views of the distribution of light emitting the backlight module at different time periods.
Figure 10C:
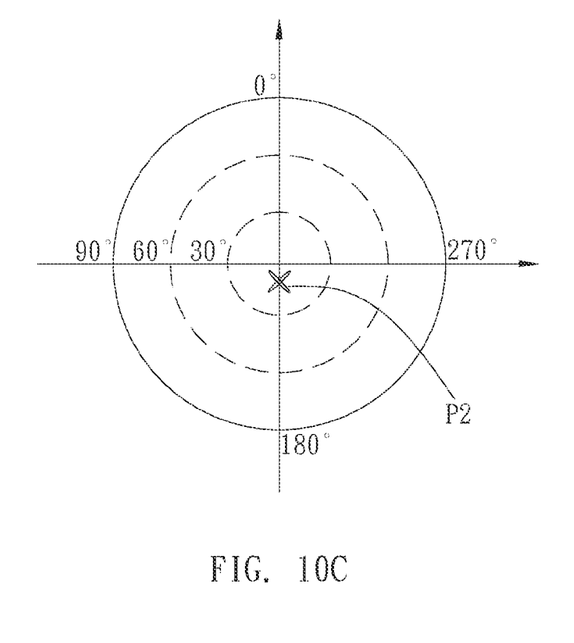

As shown in FIG. 10A, when the portrait mode is operated, the first light source 710 and the fourth light source 740 are simultaneously activated in a third time period T3 and deactivated in a fourth time period T4. The second light source 720 and the third light source 730 are simultaneously deactivated in the third time period T3 and activated in the fourth time period T4. FIG. 10B and FIG. 10C respectively show the distribution of the first peak area P1 in the third time period T3 and the distribution of the second peak area P2 in the fourth time period T4. Obviously, when the portrait mode is operated, the first peak area P1 and the second peak area P2 may intensively fall on the short axis.

Figure 11A:
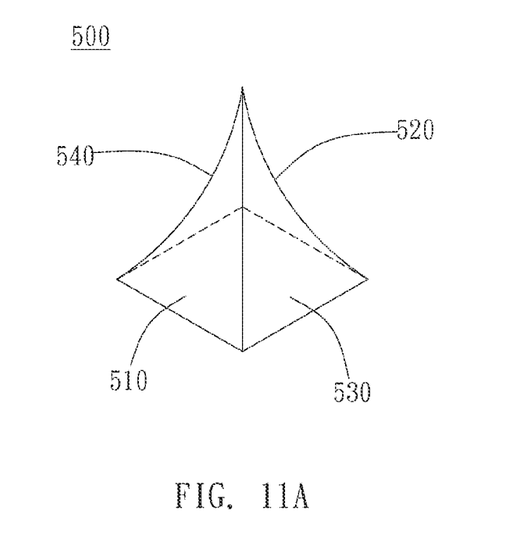
FIGS. 11A and 11B are schematic views of different embodiments of microstructures.
Figure 11B:
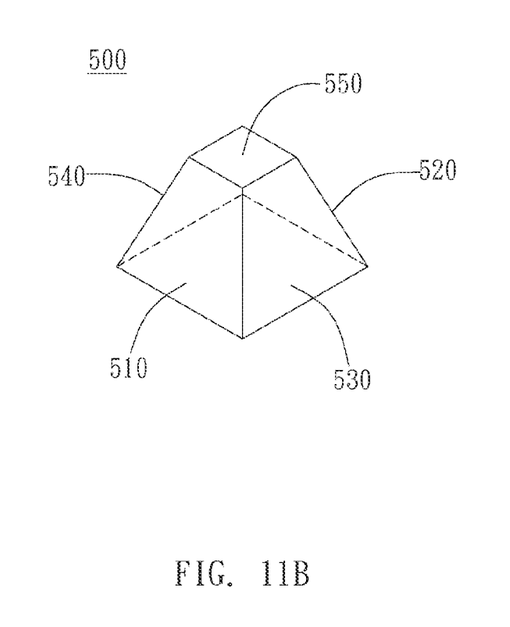

FIG. 11A is another embodiment of the microstructures 500. In this embodiment, the first surface 510, the second surface 520, the third surface 530, and the fourth surface 540 are concave surfaces. However, in different embodiments, only some of the four surfaces mentioned above may be concave surfaces. In another embodiment shown in FIG. 11B, the microstructures 500 are frustums (i.e. truncated pyramids). As shown in FIG. 11B, the first surface 510, the second surface 520, the third surface 530, and the fourth surface 540 are sidewalls of the frustum and a top surface 550 of the frustum is substantially parallel to the light emitting surface 313. The four sides of the top surface 550 are respectively connected to the first surface 510, the second surface 520, the third surface 530, and the fourth surface 540.

Figure 12:
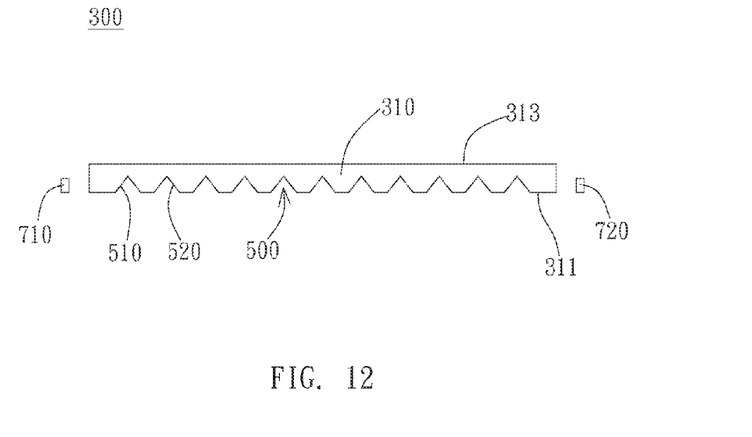
FIG. 12 is a schematic view of another embodiment of the backlight module.

FIG. 12 is a schematic view of another embodiment of the backlight module. In this embodiment, the microstructures 500 are disposed on the bottom surface 311 of the light guide plate 310. As shown in FIG. 12, the microstructure 500 is a pyramid cavity recessed into the bottom surface 311 and the first surface 510 and the second surface 520 are sidewalls defining the pyramid cavity. Moreover, in different embodiments, the microstructures 500 may be disposed on both of the bottom surface 311 and the light emitting surface 313, wherein the microstructures 500 disposed on the light emitting surface 313 are preferably corresponding to the microstructures 500 disposed on the bottom surface 311 to achieve a better effect.

Figure 13:
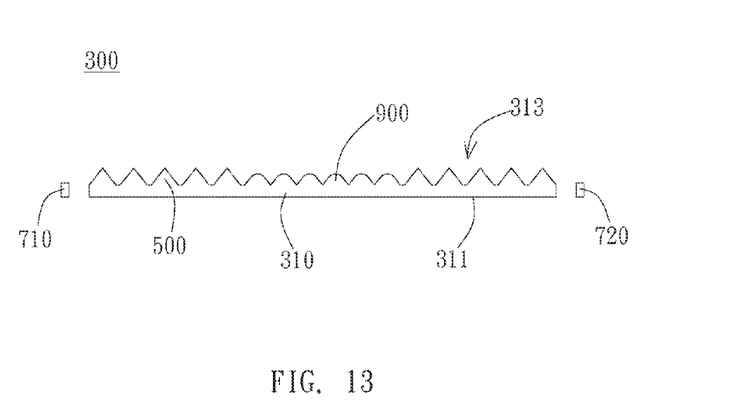
FIG. 13 is a schematic view of an embodiment of the backlight module with auxiliary structures.

As shown in FIG. 13, in addition to the microstructures 500, a plurality of auxiliary structures 900 are also disposed on the light emitting surface 313 of the light guide plate 310. The geometric shapes of the auxiliary structure 900 and the microstructure 500 are different; as shown in FIG. 13, the auxiliary structure 900 is preferably a hemisphere or may be other shapes. In this embodiment, the microstructures 500 are disposed near the first light source 710 and the second light source 720 while the auxiliary structures 900 are disposed farther from the first light source 710 and the second light source 720. The distribution density of the auxiliary structures 900, for example, is larger than the distribution density of the microstructures 500. Brightness or other optical performance of the backlight module 300 can be taken into consideration by disposing the auxiliary structures 900.

In the embodiments described above, the microstructures can be disposed uniformly or non-uniformly. When the microstructures are disposed non-uniformly, the distribution density of the microstructures or the auxiliary structures farther from the light source may be, but is not limited to, larger than the distribution density of the microstructures near the light source.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A backlight module for a three-dimensional display apparatus, comprising:
   a light guide plate having a bottom surface and a light emitting surface opposite to the bottom surface;
   a plurality of microstructures disposed in a non-concentric manner on at least one of the bottom surface and the light emitting surface, wherein each microstructure has a first surface and a second surface opposite to the first surface, a third surface and a fourth surface opposite to the third surface, the first surface to the fourth surface together form four sidewalls of a pyramid body;

a first light source disposed at a first corner of the light guide plate;

a second light source disposed at a second corner opposite to the first light source;

a third light source disposed at a third corner of the light guide plate; and a fourth light source disposed at a fourth corner of the light guide plate opposite to the third light source, wherein the first light source and the second light source are disposed along a first diagonal line of the light guide plate, the third light source and the fourth light source are disposed along a second diagonal line of the light guide plate, and the first surface of each microstructure is distributed perpendicular to a normal line of the first light source, the second surface of each microstructure is distributed perpendicular to a normal line of the second light source, the third surface of each microstructure is distributed perpendicular to a normal line of the third light source, the fourth surface of each microstructure is distributed perpendicular to a normal line of the fourth light source; the first surface and the second surface of each microstructure are distributed in an orientation direction, and wherein the orientation direction and a side edge of the light guide plate form an angle of about 45 degrees;

wherein when the three-dimensional display apparatus is operated in a landscape mode, the first light source is activated in a first time period and deactivated in a second time period, and the second light source is deactivated in the first time period and activated in the second time period, wherein the first time period and the second time period are arranged alternatively; and when the three-dimensional display apparatus is operated in a portrait mode, the first light source is activated in a third time period and deactivated in a fourth time period, and the second light source is deactivated in the third time period and activated in the fourth time period, wherein the third time period and the fourth time period are arranged alternatively.

2. The backlight module of claim 1, wherein a connecting line between the third corner and the fourth corner is not parallel to a connecting line between the first corner and the second corner.

3. The backlight module of claim 1, wherein an included angle between each surface of the microstructure and the bottom surface or between each surface of the microstructure and the light emitting surface is between about 40 degrees and about 50 degrees.

4. The backlight module of claim 1, wherein the first light source and the second light source are activated alternatively.

5. The backlight module of claim 1, wherein the first surface, the second surface, the third surface, and the fourth surface are concave surfaces.

6. The backlight module of claim 1, wherein each of the microstructures further has:

a top surface substantially parallel to the light emitting surface, the top surface connecting the first surface, the second surface, the third surface, and the fourth surface.

7. The backlight module of claim 1, wherein the first surface and the second surface of each of the microstructures form a projection pitch between 0.01 mm and 0.07 mm.

8. The backlight module of claim 1, further comprising a plurality of auxiliary structures formed on at least one of the bottom surface and the light emitting surface, wherein the auxiliary structures are different from the microstructures, the microstructures are disposed closer to the first light source and the second light source than the auxiliary structures, and the distribution density of the auxiliary structures is larger than the distribution density of the microstructures.

9. The backlight module of claim 1, wherein the orientation direction is substantially along or parallel to the first diagonal line.

10. A three-dimensional display apparatus, comprising:
a backlight module of claim 1; and
a display panel disposed on the backlight module.

11. The three-dimensional display apparatus of claim 10, further comprising a prism film disposed between the backlight module and the display panel.

12. A backlight module for a rotate three-dimensional display apparatus, comprising:

a light guide plate having a long axis and a short axis perpendicular to the long axis, and having a plurality of microstructures in a form of a pyramid body and disposed in a non-concentric manner, wherein each of the plurality of microstructures comprises four sidewalls, a first surface and a second surface of said four sidewalls are distributed along a first diagonal line, a third surface and a fourth surface of said four sidewalls are distributed along a second diagonal line;

a first light source, a second light source, a third light source, and a fourth light source disposed at four corners of the light guide plate, respectively; wherein the first surface of each microstructure faces a light emitting direction of the first light source; the second surface of each microstructure faces a light emitting direction of the second light source; the third surface of each microstructure faces a light emitting direction of the third light source; the fourth surface of each microstructure faces a light emitting direction of the fourth light source;

wherein the first light source and the second light source are disposed along the first diagonal line, the third light source and the fourth light source are disposed along the second diagonal line, a connecting line between the first light source and the third light source is parallel to the short axis, and a connecting line between the first light source and the fourth light source is parallel to the long axis;

wherein when the long axis of the light guide plate is disposed parallel to the ground, the first light source and the third light source are simultaneously activated in a first time period and deactivated in a second time period, and the second light source and the fourth light source are deactivated in the first time period and simultaneously activated in the second time period, wherein the first time period and the second time period are arranged alternatively; and when the short axis of the light guide plate is disposed parallel to the ground, the first light source and the fourth light source are simultaneously activated in a third time period and deactivated in a fourth time period, and the second light source and the third light source are deactivated in the third time period and simultaneously activated in the fourth time period, wherein the third time period and the fourth time period are arranged alternatively.

* * * * *